United States Patent [19]

Kasugai et al.

[11] Patent Number: 5,104,472
[45] Date of Patent: Apr. 14, 1992

[54] METHOD OF BLOW MOLDING A PARISON AGAINST AN INSERT HAVING A GROOVE FILLED WITH ADHESIVE

[75] Inventors: Joji Kasugai; Ryo Ohtsubo, both of Aichi, Japan

[73] Assignee: Toyoda Gosei Co., Ltd., Nishikasugai, Japan

[21] Appl. No.: 605,856

[22] Filed: Oct. 31, 1990

[30] Foreign Application Priority Data

Oct. 31, 1989 [JP] Japan ................... 1-285238

[51] Int. Cl.$^5$ ............................... B29C 49/20
[52] U.S. Cl. ...................... 156/245; 264/155; 264/516; 264/536
[58] Field of Search .............. 264/516, 513, 515, 155, 264/536; 425/503, 525; 156/245

[56] References Cited

U.S. PATENT DOCUMENTS

| | | | |
|---|---|---|---|
| 3,705,931 | 12/1972 | Confer et al. | 264/516 |
| 4,280,859 | 7/1981 | Thompson | 264/515 |
| 4,342,799 | 8/1982 | Schwochert | 264/516 |
| 4,660,498 | 4/1987 | Madison | 264/516 |
| 4,664,958 | 5/1987 | Jones | 264/515 |
| 4,719,072 | 1/1988 | Kojima et al. | 264/515 |
| 4,952,347 | 8/1990 | Kasugai | 264/29 |

FOREIGN PATENT DOCUMENTS

| | | | |
|---|---|---|---|
| 1753465 | 9/1969 | Fed. Rep. of Germany | 264/516 |
| 7235944 | 5/1974 | France | 264/516 |
| 60-125624 | 7/1985 | Japan | 264/523 |
| 1542852 | 3/1979 | United Kingdom | 264/516 |

Primary Examiner—Jan H. Silbaugh
Assistant Examiner—Catherine Timm
Attorney, Agent, or Firm—Cushman, Darby & Cushman

[57] ABSTRACT

A method of producing a blow molded product. The method includes preparing a tubular part having a groove at a portion that is to be embedded in a body portion. The groove is formed in a peripheral edge portion of a hole in a manner so as to surround the hole. A thermoplastic filler is filled in the groove over the entire area of the groove. The tubular part is then set in a blow mold as an insert. A parison is then expanded within the mold while the temperature is maintained at a level higher than the softening temperature of the filler.

3 Claims, 4 Drawing Sheets

METHOD OF BLOW MOLDING A PARISON AGAINST AN INSERT HAVING A GROOVE FILLED WITH ADHESIVE

BACKGROUND OF THE INVENTION

1. Field of the Invention

This invention relates to an improved method of producing a blow molded product including a blow molded body portion and a tubular part embedded in the body portion by insertion, the tubular part having a hole communicating with an internal space of the body portion. This method is suited, for example, for forming an engine intake pipe. The description will hereinafter be made, taking this pipe as an example of blow molded product.

2. Prior Art

Among pipes of the type described, there is the type of pipe which is connected to another pipe at other portion than its opposite ends (that is, its peripheral wall). In this case, a tubular part such as a nipple must be embedded in the peripheral wall of the pipe.

Where the pipe has a relatively simple configuration, the pipe and the nipple can be integrally blow molded. However, when the pipe has a complicated configuration having a three-dimensionally bent portion or the like, or depending on the position of embedding of the nipple, the nipple, in some cases, can not be blow molded together with the intake pipe.

In this case, the pipe has been blow molded in the following manner.

First, a nipple is prepared, and this nipple is set, as an insert, in a blow mold. Then, a parison for forming a body portion of the pipe is inserted into the mold, and the air is blown into the parison to expand the parison into contact with the surface of the cavity. At this time, the material of the parison partially envelops the nipple, so that the nipple is embedded in the body portion of the pipe.

In the above blow molding, where the molding materials for the body portion of the pipe and the nipple are both a polyolefin-type resin such as PP, the body portion and the nipple can be fusingly bonded together, so that a relatively good airtightness between the two can be assured. The reason is considered to be that because of a relatively low melting temperature of PP or the like and of a wide temperature range of the molding, the bonding surfaces of the two are sufficiently fused at the time of the blow molding, and are connected together.

However, where the blow molding is effected using a so-called such as polyamide, the melting temperature of such material is high, and also a temperature range of the blow molding is narrow, so that airtightness can not be assured between the body portion and the nipple.

SUMMARY OF THE INVENTION

It is an object of this invention to overcome the above problem of the prior art.

According to the present invention, there is provided a method of producing a blow molded product, which comprises the steps of:

(a) preparing a tubular part which has a groove at that portion thereof to be embedded in a body portion, said groove being formed in a peripheral edge portion of a hole in surrounding relation to the hole, and a thermoplastic filler being filled in the groove over an entire area of the groove;

(b) setting the tubular part, as an insert, in a blow mold; and (c) expanding a parison within the mold while maintaining a temperature higher than a softening temperature of the filler.

In the above blow molded product, since the filler is interposed between the body portion and the tubular part, airtightness is assured between the two.

It can be considered to use, as the filler, the type having fluidity at room temperature (e.g., a cold-setting type (two-part type) adhesive or a dry-type adhesive). However, (1) there is a possibility that after the tubular part is set in the mold, the filler may flow into the mold, so that the cavity surface is contaminated to damage the design of the product. Therefore, the filler on the cavity surface must be removed, and time and labor are required for the maintenance. (2) Also, when the adhesive of the above type is used, the timing of filling the adhesive in the groove of the tubular part is limited to the time immediately before setting the tubular part in the mold, in connection with the setting or curing time of the adhesive. Therefore, the blow molding is limited.

On the other hand, when the thermoplastic type filler is used as in the present invention, (1) the filler itself will not change its nature before the heat is applied thereto, and therefore the timing of filling the filler in the tubular part is not particularly limited, thus improving the operability of the blow molding.

(2) Further, the thermoplastic type filler comes to have fluidity when heat is applied to the filler after the tubular part is set in the mold. At this time, the parison is expanded, and the filler has already been covered by the material of the parison. Therefore, the filler hardly flows into the cavity surface.

Thus, in the present invention, the operability of the blow molding of the blow molded product (in which the filler is interposed between the body portion and the tubular part to maintain the airtightness between the two) is enhanced.

DESCRIPTION OF THE PREFERRED EMBODIMENT OF THE INVENTION

Figure 1:
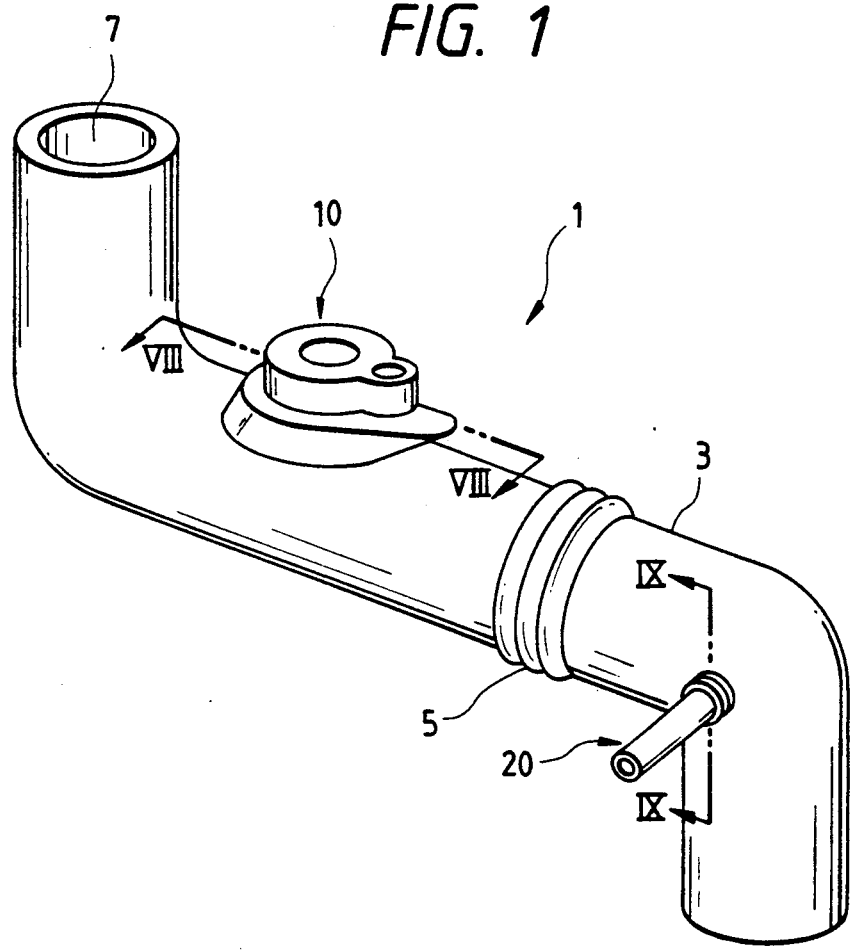
FIG. 1 is a perspective view of a blow molded product produced by a method according to the present invention.

The invention will now be described in further detail with reference to a method of producing an intake pipe 1 for a vehicle shown in FIG. 1 by way of example.

The pipe 1 is to be mounted around an engine, and therefore in view of heat resistance, a body portion 3 and tubular parts 10 and 20 are made of polyamide. A bellows portion 5 absorbs vibrations, etc.

The production method of this embodiment comprises (1) a step of preparing the tubular parts 10 and 20, (2) a setting step, (3) a blowing step, (4) a mold release step, and (5) a punching step.

(1) STEP FOR PREPARING THE TUBULAR PARTS 10 AND 20

Figure 2:
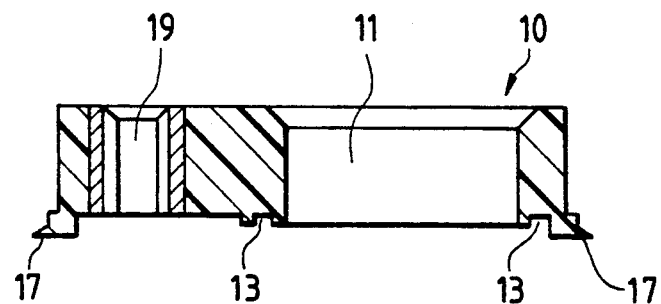
FIG. 2 is a cross-sectional view of a valve mounting member (tubular part) taken along the line II—II of FIG. 3.
Figure 3:
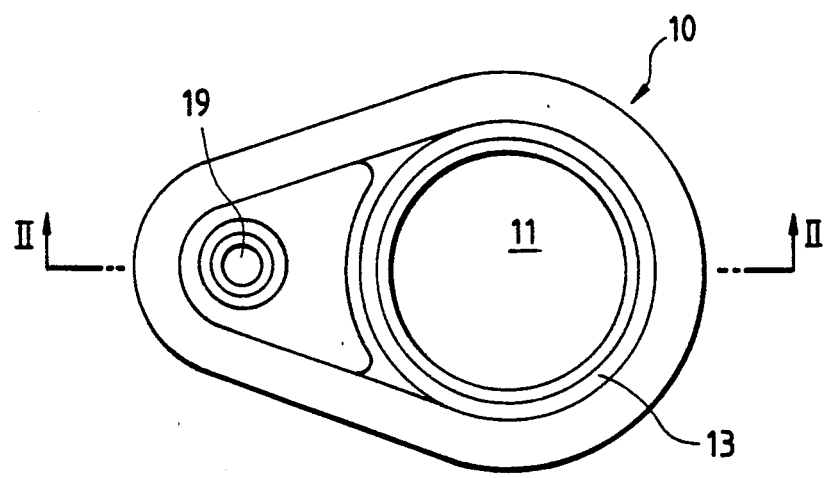
FIG. 3 is a bottom end view of the valve mounting member.

One of the tubular parts is a valve mounting member 10. FIG. 2 is a cross-sectional view of the valve mounting member 10, and FIG. 3 is a bottom end view thereof. The valve mounting member 10 has two through holes 11 and 19. A valve is inserted into the greater-diameter hole 11, and the smaller-diameter hole 19 is a threaded hole for fixing the valve. At the lower surface of the valve mounting member 10, a groove 13 is formed in the peripheral edge portion of the hole 11, and surrounds the hole 11. A filler 15 is filled in the groove 13 over the entire area of the groove 13. The filler 15 is a hot-melt type adhesive for polyamide (specifically, this adhesive is "MT MELT" (tradename) marketed by Mitsui Toatsu K. K. and has a melting temperature of 142.5° C.). The filler 15 has a softening temperature lower than the temperature within the mold used at the later blowing step. The filler 15 may not have the ability of adhesively bonding the valve mounting member 10 and the body portion 3 together (that is, the ability of effecting polyamido-to-polyamido bonding).

The filler 15 does not possess fluidity at room temperature. In this embodiment, after the valve mounting member 10 is injection molded, the filler 15 is filled in the groove 13. Of course, the filler 15 only need to be filled in the groove 13 before the next step, that is, the setting step (2).

Figure 8:
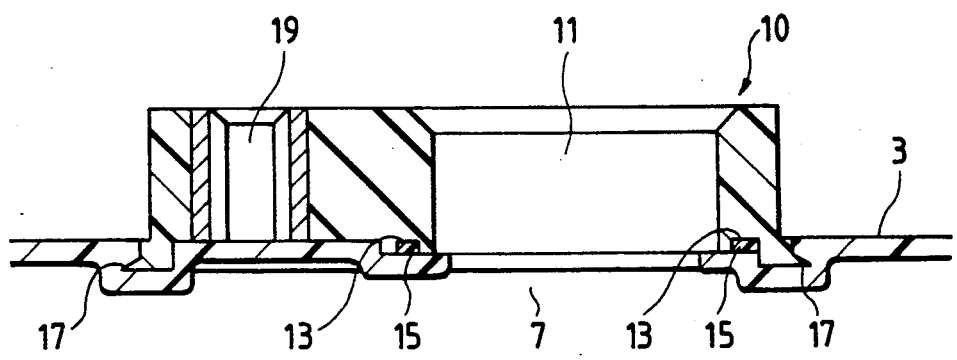
FIG. 8 is a cross-sectional view taken along the line VIII—VIII of FIG. 1, showing the condition of embedding of the valve mounting member in a body portion.

A flange 17 is formed on the lower edge of the valve mounting member 10. As shown in FIG. 8, the flange 17 is embedded in the material of the body portion 3 so as to provide an undercut.

Figure 4:
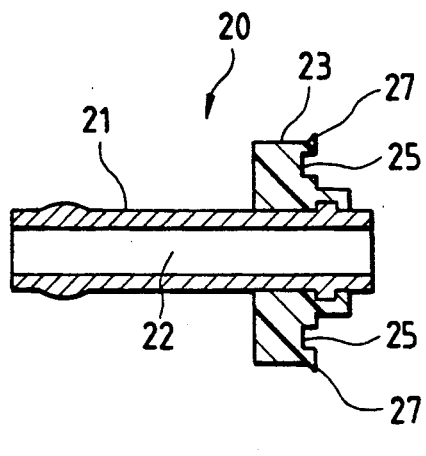
FIG. 4 is a cross-sectional view of a nipple (tubular part) taken along the line IV—IV of FIG. 5.
Figure 5:
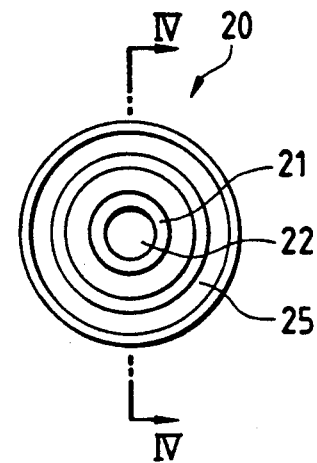
FIG. 5 is a bottom end view of the nipple.

The other of the tubular parts is a nipple 20. FIG. 4 is a longitudinal cross-sectional view of the nipple 20, and FIG. 5 is an end view thereof. The nipple 20 is formed by injection molding a base portion 23 of a resin, using a central tube 21 of metal as an insert. Of course, the nipple 20 can be made entirely of a resin. Reference numeral 22 denotes a hole or bore, and reference numeral 27 denotes a flange.

The base portion 23 has a groove 25 disposed in surrounding relation to the central tube 21. A thermoplastic filler 15 is also filled in the groove 25, as is the case with the valve mounting member 10.

(2) SETTING STEP

In this step, the tubular members 10 and 20 prepared in the preceding step are set in a blow mold 30.

Figure 6:
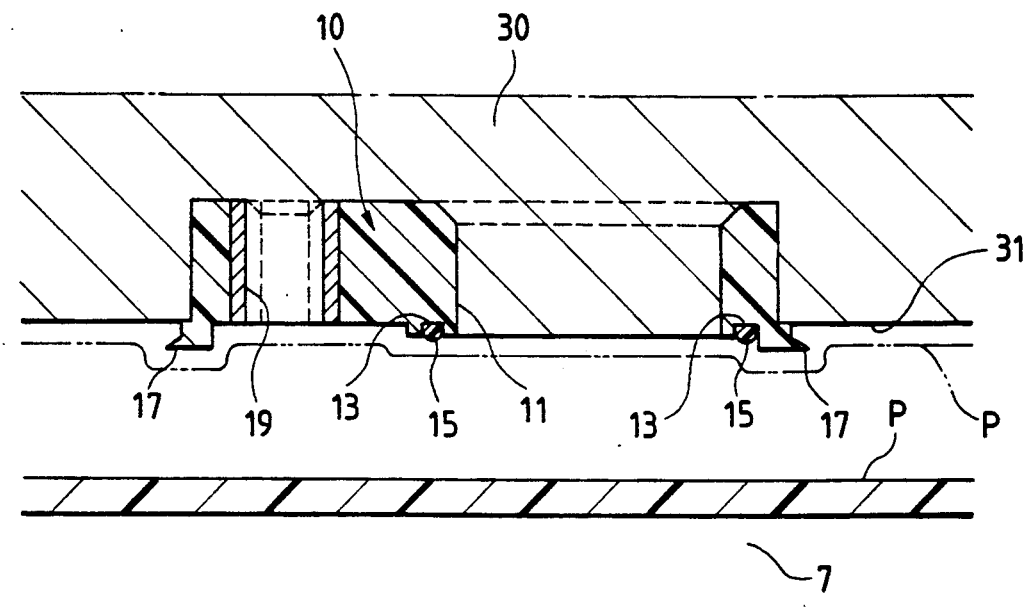
FIG. 6 is a cross-sectional view showing the condition of the valve mounting member at a setting step and a blowing step.

As shown in FIG. 6, the valve mounting member 10 is set, as an insert, in the mold 30. The showing of holder means such a set pin is omitted. Reference character P denotes a parison. As shown in the drawings, part of the mold 30 is inserted into the through holes 11 and 19 so that the material of the parison P may not be introduced into the holes 11 and 19.

Although the filler 15 is slightly elevated in temperature by the mold 30, it will not reach the softening temperature, and therefore the filler is retained in the groove 13. Therefore, the filler 15 will not flow into the mold, thus preventing the filler 15 from contaminating a cavity surface 31 of the mold.

Figure 7:
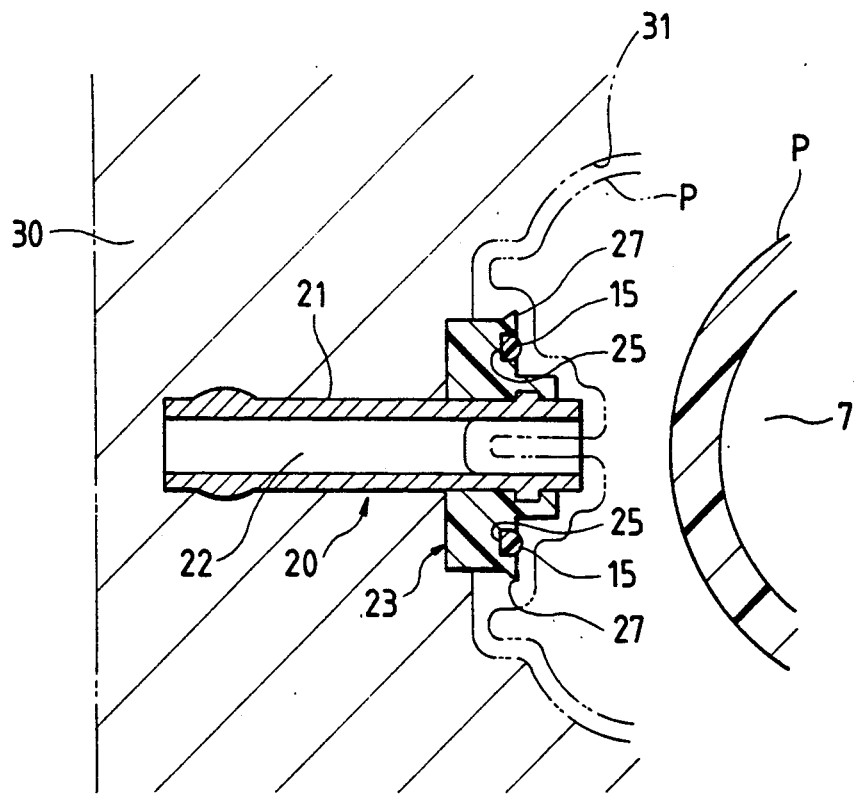
FIG. 7 is a cross-sectional view showing the condition of the nipple at the above steps.

As shown in FIG. 7, the nipple 20 is set, as an insert, in the mold 30. The filler 15 of the nipple 20 will not flow into the mold, as is the case with the valve mounting member 10.

(3) BLOWING STEP

In this step, the air is blown into the parison P to expand it. By doing so, the material of the parison P is brought into contact with the cavity surface 31 as indicated in dots-and-dash lines in FIGS. 6 and 7. At the same time, the material of the parison P covers the flanges 17 and 27 formed respectively on the tubular members 10 and 20, thereby ensuring that the tubular members 10 and 20 may not be disengaged from the body portion 3.

This step is carried out in a plastic condition of the parison P, that is, at temperatures above the melting temperature of the parison P. Therefore, when the material of the parison P comes to cover the tubular members 10 and 20, its heat is applied to the fillers 15 to soften them. Then, the parison P is expanded to compress the fillers 15, so that the fillers 15 are deformed to fully fill in the grooves 13 and 25, with no space remaining therein. As a result, the airtightness between the body portion 3 and the tubular members 10 and 20 is assured. Particularly, in this embodiment, since the hot-melt type adhesive is used as the filler 15, the strength of connection between the two is enhanced.

(4) MOLD RELEASE STEP

In this step, when the workpiece within the mold 30 is cooled to a predetermined temperature, the mold is opened, and the workpiece is removed from the mold.

(5) PUNCHING STEP

Figure 9:
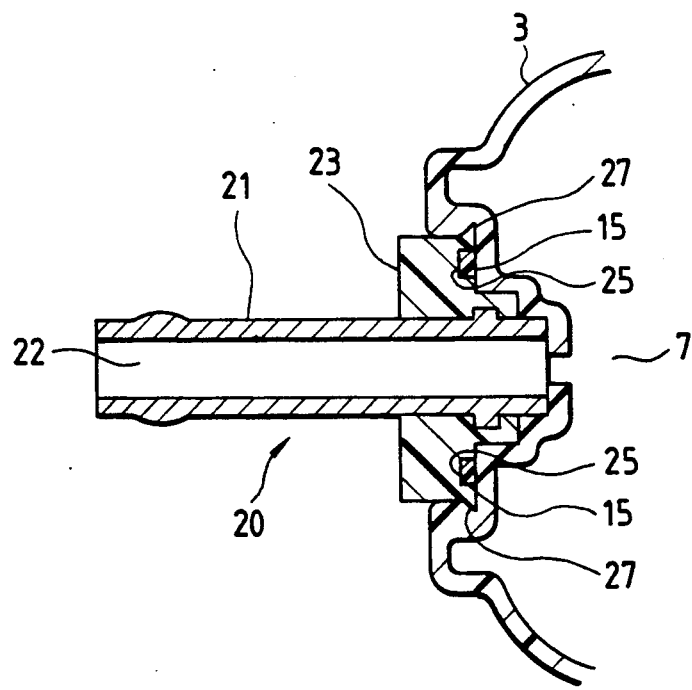
FIG. 9 is a cross-sectional view taken along the line IX—IX of FIG. 1, showing the condition of embedding of the nipple.

In the workpiece obtained in the preceding step, the holes 11 and 22 are closed by the material of the parison P as indicated by dots-and-dash lines in FIGS. 6 and 7. Therefore, in this step, those portions of the parison P respectively closing the holes 11 and 22 are punched (see FIGS. 8 and 9).

Thus, the finished product is obtained.

In the above embodiment, with respect to the tubular parts 10 and 20 to be inserted, the molding material of those portions thereof to be joined to the body portion 3 is the same as the molding material of the body portion 3. Of course, the molding material of the insert is not particularly limited, and for example, the central tube 21 of the nipple 20 may be embedded directly in the body portion 3. In this case, a flange is formed on the lower edge of the central tube 21, and a groove is formed in this flange in surrounding relation to the hole 22.

The tubular members may have a closed bottom.

What is claimed is:

1. A method of producing a blow molded product including a blow molded body portion and a tubular part embedded in the body portion by insertion, the tubular part having a hole communicating with an internal space of the body portion, said method comprising the steps of:
  (a) preparing the tubular part, which has a groove located in a portion of said tubular part which becomes partially embedded in the body portion during step (c), said groove being formed in a peripherial edge portion of the hole in surrounding relation to the hole, said preparing step comprising filling said groove with a thermoplastic filler over an entire surface of said groove;
  (b) setting the prepared tubular part, as an insert, in a blow mold heated to an elevated temperature and closing the mold, said filler having a softening temperature above said elevated temperature; and
  (c) expanding a parison within said mold while maintaining a temperature higher than the softening temperature of said filler so that said parison contacts said prepared tubular part, softening and compressing said filler to enhance airtightness between said body portion and said tubular part, and contacts a cavity thereby forming said blow molded product.

2. The method of producing a blow molded product according to claim 1 further comprising the step of removing the blow molded product from said mold.

3. The method of producing a blow molded product according to claim 2 further comprising the step of punching the material of said parison so as remove the material that undesirably closes said hole, said punching step including punching the material along an inner wall of the hole.

* * * * *